United States Patent
Natsume et al.

(10) Patent No.: US 7,755,695 B2
(45) Date of Patent: Jul. 13, 2010

(54) CAMERA SYSTEM AND LENS APPARATUS

(75) Inventors: Satoshi Natsume, Kanagawa (JP);
Kazumasa Yoshikawa, Tochigi (JP);
Yasuyuki Tomita, Tochigi (JP);
Katsumi Karasawa, Tochigi (JP);
Takashi Kameyama, Kanagawa (JP);
Seiji Sato, Kanagawa (JP); Hidekazu Suto, Tokyo (JP); Hirotsugu Terada, Kanagawa (JP)

(73) Assignees: Canon Kabushiki Kaisha (JP); Sony Corporation (JP)

( * ) Notice: Subject to any disclaimer, the term of this patent is extended or adjusted under 35 U.S.C. 154(b) by 1068 days.

(21) Appl. No.: 10/953,926

(22) Filed: Sep. 29, 2004

(65) Prior Publication Data
US 2005/0094023 A1     May 5, 2005

(30) Foreign Application Priority Data
Oct. 2, 2003    (JP)   ............................ 2003-343923

(51) Int. Cl.
*H04N 5/232*      (2006.01)
*H04N 5/262*      (2006.01)
*H04N 5/228*      (2006.01)
*G03B 17/00*      (2006.01)
*G02F 1/29*       (2006.01)

(52) U.S. Cl. .................. 348/345; 348/347; 348/240.99; 348/208.11; 396/79; 359/319

(58) Field of Classification Search ............ 348/240.99, 348/208.12, 333.07, 345, 208.11, 211.9, 348/326, 240.1, 240.3, 347, 360; 359/380, 359/676, 319, 383, 410; 396/529, 79, 80, 396/82, 93, 102, 103, 131, 76, 379, 85
See application file for complete search history.

(56) References Cited

U.S. PATENT DOCUMENTS 5,369,461 A  *   11/1994   Hirasawa et al. ............ 396/135
5,956,528 A  *   9/1999   Tanaka ........................ 396/52

(Continued)

FOREIGN PATENT DOCUMENTS

EP          0 667 546 A2     8/1995

(Continued)

OTHER PUBLICATIONS

EP Search Report/Communication (Feb. 2, 2005).

*Primary Examiner*—Tuan Ho
*Assistant Examiner*—Marly Camargo
(74) *Attorney, Agent, or Firm*—Rossi, Kimms & McDowell LLP

(57) ABSTRACT

A camera system is disclosed which allows different types of lens apparatuses to be used in combination with a single image-taking apparatus without requiring changes of focus control signals on the side of the image-taking apparatus depending on the type of a lens apparatus mounted on the image-taking apparatus. The camera system includes an image-taking apparatus which outputs a focus control signal and a lens apparatus which includes a focus lens and is mounted on the image-taking apparatus. The lens apparatus includes a controller which produces a drive signal according to a type of focus of the lens apparatus based on the focus control signal and controls drive of the focus lens based on the drive signal.

3 Claims, 8 Drawing Sheets

U.S. PATENT DOCUMENTS

| | | | |
|---|---|---|---|
| 6,348,948 B1 * | 2/2002 | Kyuma | 348/360 |
| 6,373,524 B2 * | 4/2002 | Suda et al. | 348/345 |
| 6,650,367 B1 * | 11/2003 | Kyuma | 348/240.1 |
| 6,683,652 B1 * | 1/2004 | Ohkawara et al. | 348/347 |
| 6,731,339 B2 * | 5/2004 | Ohkawara | 348/347 |
| 7,098,954 B2 * | 8/2006 | Suda et al. | 348/347 |
| 7,151,570 B2 * | 12/2006 | Kaneda | 348/360 |
| 7,292,280 B2 * | 11/2007 | Yamazaki et al. | 348/363 |
| 7,295,243 B2 * | 11/2007 | Hata | 348/371 |
| 7,408,719 B2 * | 8/2008 | Hosoya | 359/686 |
| 2001/0038418 A1 | 11/2001 | Suda et al. | 348/347 |
| 2002/0109784 A1 * | 8/2002 | Suda et al. | 348/345 |
| 2006/0023091 A1 * | 2/2006 | Uchiyama | 348/240.1 |

FOREIGN PATENT DOCUMENTS

| | | |
|---|---|---|
| JP | 1-280709 | 11/1989 |
| JP | 6-62305 | 3/1994 |
| JP | 08172561 A * | 7/1996 |
| JP | 8-220414 | 8/1996 |
| JP | 09-023367 A | 1/1997 |
| JP | 2003 140247 A | 5/2003 |

* cited by examiner

CAMERA SYSTEM AND LENS APPARATUS

BACKGROUND OF THE INVENTION

1. Field of the Invention

The present invention relates to a camera system which includes an image-taking apparatus, such as a television camera and a video camera, and a lens apparatus mounted on the image-taking apparatus.

2. Description of the Related Art

Camera systems for use in television broadcast or video recording include an auto-focus (hereinafter abbreviated as AF) type in which a video camera is integral with a lens and focusing is performed automatically, and a manual focus (hereinafter abbreviated as MF) type in which a lens is removably mounted on a camera and focusing control is performed in response to manual operation of a manipulation member.

Recently, the AF has also been used in camera systems which employ interchangeable lenses.

Conventionally, only AF-capable lenses can be used in AF camera systems and only MF-capable lenses can be used in MF camera systems. In recent years, however, there is an increasing need for camera systems in which both of MF-capable lenses and AF-capable interchangeable lenses can be used.

In the MF-capable lenses, however, a so-called front focus type is typically employed in which a focus lens is placed closer to an object side than a variable magnification lens. On the other hand, in the AF-capable lenses, a so-called rear focus type is usually employed in which a focus lens is placed closer to an image side than a variable magnification lens. This is because of the operability, controllability and portability of the lenses.

Japanese Patent Application Laid-Open No. H6 (1994)-62305 has disclosed an AF method in such a camera system, for example. In the AF method, a signal indicating the sharpness evaluation value of an object is extracted from a video signal taken by a camera to move a focus lens in a direction in which the strength of the signal is increased. The AF method is called a climbing method (a contrast detection method).

With a smaller size and a lighter weight of the entire camera system, zoom lenses of the rear focus type allowing reductions in size and weight are used in the AF-capable lenses. In the zoom lenses of the rear focus type, the position of an image plane changes with varied magnification even when the same distance to an object is maintained, so that the position of a focus lens needs to be adjusted in association with the varied magnification. Such a method of adjusting a focus lens has been disclosed, for example, in Japanese Patent Application Laid-Open No. H1 (1989)-280709, Japanese Patent Application Laid-Open No. H8 (1996)-220414 and the like.

Description is now made for the structure of a conventional zoom lens of the rear focus type. In FIG. 4, the zoom lens is comprised of four lens units including, in order from an object side, a fixed front lens unit (a first lens unit) 131, a variable magnification lens unit 132 which is movable on an optical axis (a second lens unit, hereinafter referred to as a zoom lens unit), a fixed lens unit (a third lens unit) 136, and a focus lens unit (a fourth lens unit) 118 which is movable on the optical axis for correcting image plane variations in varying magnification and for focusing.

Reference numeral 111 shows a zoom ring. When the zoom ring 111 is rotated, the zoom lens unit 132 is moved in the optical axis direction by a cam (not shown) formed on a fixed barrel 137 to perform variable magnification.

Reference numeral 115 shows a zoom motor which drives the zoom ring 111 through interlocking gears 133 and 134. Reference numerals 119 and 120 show guide bars which guide a moving frame 122 for holding the focus lens unit 118 in the optical axis direction.

Reference numeral 121 shows a focus motor which is realized by a step motor, for example. The moving frame 122 has a screw portion formed thereon which engages with a screw shaft 123 which is driven by the focus motor 121. Thus, when the screw shaft 123 is rotated by the focus motor 121, the moving frame 122 is moved in the optical axis direction together with the focus lens unit 118. Reference numeral 135 shows a stop unit which adjusts an amount of light.

FIG. 6 shows trajectory data which represents the positional relationship between the zoom lens unit 132 and the focus lens unit 118 on the optical axis for various object distances. The trajectory data shows the moving trajectories of the focus lens unit 118 for maintaining an in-focus state of an object at distances from INF (infinity) to MOD (minimum object distance).

For the rear focus lens, the focus lens unit 118 exists closer to an image side than the zoom lens unit 132, so that simply driving the zoom lens unit 132 in the structure shown in FIG. 4 causes the position of the image plane to be changed with varied magnification. To maintain the in-focus state, it is necessary to determine the position where the focus lens unit 118 should be placed from the position of the zoom lens unit 132 and the object distance in the trajectory data of FIG. 6 to drive the focus lens unit 118 in association with varied magnification.

Next, description is made for AF processing in the aforementioned camera system which employs the rear focus lens with reference to a block diagram of FIG. 5. In FIG. 5, reference numeral 102 shows an image-pickup element such as a CCD sensor and a CMOS sensor, and 103 a camera processing circuit which produces a video signal based on an output signal from the image-pickup element 102. The video signal is output to an AF circuit 104. The AF circuit 104 extracts a high-frequency component from the video signal and outputs it as an AF evaluation value signal to a CPU 140.

In normal AF processing (AF processing without varying magnification), the CPU 140 causes the focus lens unit 118 to wobble through a lens control section 139 on the zoom lens side to determine a drive direction of the focus lens unit 118 in which the strength of the AF evaluation value signal is increased. The CPU 140 outputs a focus control signal for driving the focus lens unit 118 by a predetermined drive amount in the determined direction and drives the focus lens unit 118 until the AF evaluation value signal is at the maximum.

In the AF processing with varied magnification, the CPU 140 calculates the drive amount of the focus lens unit 118 by using the trajectory data in FIG. 6 stored in a trajectory data memory 145 and information about the current positions of the zoom lens unit 132 and the focus lens unit 118 detected as described later and outputs a focus control signal according to the calculation result.

On the zoom lens side, reference numeral 106 shows a zoom position detector which detects the position of the zoom lens unit 132 on the optical axis. Reference numeral 107 shows a zoom motor driver which drives the zoom motor 115. Reference numeral 125 shows a focus motor driver which drives the focus motor 121 realized by the step motor. The number of drive pulses input to the focus motor 121 is counted by the CPU 140. The count is used to detect the position of the focus lens unit 118.

Reference numeral 138 shows a stop position detector which detects the position of blades (that is, a stop value) provided for the stop unit 135.

The lens control section 139 produces a drive signal for the zoom lens unit 132 based on a zoom control signal produced in a zoom operation circuit 141 in response to manipulation of a zoom switch 142 such as a seesaw switch. The lens control section 139 also produces a drive signal for the focus lens unit 118 based on a focus control signal output from the CPU 140.

The trajectory data shown in FIG. 6 depends on optical characteristics of a zoom lens. For example, the moving amount of a zoom lens unit varies according to the magnification of a lens. For this reason, if interchangeable lenses having various optical characteristics are used for one camera, the trajectory data of each interchangeable lens is transmitted to the camera for storage in the trajectory data memory 145 when each interchangeable lens is mounted on the camera.

The focus control signal produced in the camera system which has the AF-capable lens of the rear focus lens type includes a signal which represents the drive amount of the focus lens unit 118 calculated by using the current positions of the zoom lens unit 132 and the focus lens unit 118 and the trajectory data in order to correct the image plane variations in varying magnification.

In contrast, in the camera system which has the MF-capable lens of the front focus type, the focus lens is placed closer to the object side than the variable magnification lens and thus the position of the image plane is not changed with varied magnification. This eliminates the need to drive the focus lens unit in varying magnification.

Now, description is made for the structure of a conventional front focus type zoom lens and a manual focus control system. In FIG. 7, on the side of a camera 201, reference numeral 110 shows a zoom/focus operation circuit. Connected to the zoom/focus operation circuit 110 are a zoom operation member 112 which outputs an operation signal for servo-driving a zoom lens unit (not shown) and a focus operation member 113 which outputs an operation signal for servo-driving a focus lens unit (not shown). The zoom/focus operation circuit 110 produces and outputs control signals according to operation amounts of the respective operation members. Reference numeral 144 is a camera control section which is responsible for control of the camera.

On the other hand, on the zoom lens side, reference numeral 114 shows a focus motor which drives the focus lens unit through an interlocking gear (which has no reference numeral). Reference numeral 116 shows a focus motor driver which drives the focus motor 114 in response to a focus drive signal from a lens control section 143.

Reference numeral 117 shows a focus position detector which detects the current position of the focus lens unit 118 and transmits it to the lens control section 143. Reference numeral 124 shows a focus ring associated with the focus lens unit. The focus ring 124 is rotated by the focus motor 114 to move the focus lens unit, thereby performing manual focusing.

Reference numeral 143 shows the lens control section which controls the zoom motor 115 and the focus motor 114.

When the focus operation member 113 is operated, an operation signal output from the focus operation member 113 is input to the lens control section 143 as a focus control signal through the zoom/focus operation circuit 110. Similarly, when the zoom operation member 112 is operated, an operation signal output from the zoom operation member 112 is input to the lens control section 143 as a zoom control signal through the zoom/focus operation circuit 110.

These control signals are converted by the lens control section 143 into a focus drive signal and a zoom drive signal for achieving drive of the motors and output to the drives 116 and 107, respectively. In response to the drive signals, the drivers 116 and 107 drive the focus motor 114 and the zoom motor 115 to rotate the focus ring 124 and a zoom ring 111, respectively. In this manner, the focus lens unit and the zoom lens unit are driven.

A controller 109 which can be used to perform zoom and focus operation is connected to the camera for use in such a system, besides the operation members 112 and 113. The controller 109 outputs a control signal according to the amount of operation thereof, and the control signal is output to the lens control section 143 through the camera control section 144.

As described above, when the rear focus lens is used to perform the AF control, the focus control signal output from the camera for correcting the image plane variations associated with varied magnification is a signal which represents the position to which the focus lens unit should be moved (the drive amount), determined from the trajectory data in FIG. 6, the current position of the zoom lens unit, the current position of the focus lens, and the object distance.

On the other hand, when the front focus lens is used to perform the MF control, the focus control signal output from the camera is a signal produced according to the operation amount of the focus operation member 113.

In other words, the AF camera system with the rear focus lens and the MF camera system with the front focus lens produce the focus control signals on the camera sides in different manners, so that only dedicated interchangeable lenses can be used in each of the systems.

Next, description is made for a conventional camera system in which both of an MF-capable lens and an AF-capable lens can be used for one camera with reference to a block diagram of FIG. 8. In FIG. 8, components identical to those in FIGS. 5 and 7 are designated with the same reference numerals as those in FIGS. 5 and 7 and description thereof is omitted.

In FIG. 8, reference numeral 200 shows a lens control section which is responsible for control of a zoom lens. The zoom lens is an MF-capable interchangeable lens or an AF-capable interchangeable lens.

When the zoom lens is mounted on a camera 301, a camera control section 305 provided in the camera 301 outputs a request for transmission of an identification signal for determining whether the zoom lens is an MF-capable lens or an AF-capable lens. In response to the request, the lens control section 200 transmits the identification signal back to the camera control section 305. The camera control section 305 switches between methods of producing a focus control signal depending on the determination result. In this manner, the focus control signal appropriate for the mounted lens is produced and output to the lens.

It should be noted that some zoom lenses have no identification signals to be transmitted in response to the transmission request from the camera control section 305, in which case an identification signal cannot be transmitted back. In this case, the camera control section 305 determines that no reply is made in a certain time period and considers the mounted lens as an MF-capable lens before it starts control.

The control of the MF-capable lens is performed as described above with reference to FIG. 7. The control of the AF-capable lens is performed as described above with reference to FIG. 5. When the AF-capable lens is mounted, the camera 101 takes the trajectory data shown in FIG. 6 from the lens side and stores it in the trajectory data memory 145.

As described above, in the conventional camera system, various types of lenses are used with different arrangements such as the front focus lens and the rear focus lens and with different focus control methods such as the MF control method and the AF control method. In a camera which can accept only a particular type of lens, if another type of lens is mounted thereon, normal focus control cannot be performed.

Specifically, since the focus control signal to be provided for the MF-capable front focus lens by the camera is not consistent with the focus control signal to be provided for the AF-capable rear focus lens, both types of lenses cannot be used in each of the MF-capable camera and the AF-capable camera.

As described in FIG. 8, it is possible that the type of the mounted lens is determined on the camera side to switch between the methods of producing the focus control signal. However, to produce the focus control signal appropriate for the AF-capable lens (the rear focus lens) on the camera side, the camera must take the large amount of trajectory data from the lens at power-up, and the camera needs to have a memory of large capacity for storing the trajectory data and a calculation function for producing the focus control signal suitable for the AF-capable lens.

SUMMARY OF THE INVENTION

It is an object of the present invention to provide a camera system which allows different types of lens apparatuses to be used in combination with a single image-taking apparatus (camera) without requiring changes of focus control signals on the side of the image-taking apparatus depending on the type of a lens apparatus mounted on the image-taking apparatus, a lens apparatus, and an interchangeable lens system.

According to an aspect, the present invention provides a camera system comprising an image-taking apparatus which outputs a focus control signal, and a lens apparatus which includes a focus lens and is mounted on the image-taking apparatus. The lens apparatus includes a controller which produces a drive signal according to a type of focus of the lens apparatus based on the focus control signal and controls drive of the focus lens based on the drive signal.

According to another aspect, the present invention provides a camera system comprising an image-taking apparatus which outputs a focus control signal, a first lens apparatus which includes a first focus lens and is mounted on the image-taking apparatus, and a second lens apparatus which includes a second focus lens and is mounted on the image-taking apparatus. The second lens apparatus employs a type of focus different from a type of focus of the first lens apparatus. The first lens apparatus includes a first controller which produces a first drive signal according to the type of the first lens apparatus based on the focus control signal and controls drive of the first focus lens based on the first drive signal. The second lens apparatus includes a second controller which produces a second drive signal according to the type of the second lens apparatus based on the focus control signal and controls drive of the second focus lens based on the second drive signal.

According to another aspect, the present invention provides a lens apparatus comprising a focus lens, and a controller which produces a drive signal according to a type of focus of the lens apparatus based on a focus control signal output from an image-taking apparatus and controls drive of the focus lens based on the drive signal.

According to yet another aspect, the present invention provides an interchangeable lens system comprising a first lens apparatus which includes a first focus lens and is mounted on the image-taking apparatus, a second lens apparatus which includes a second focus lens and is mounted on the image-taking apparatus. The second lens apparatus employs a type of focus different from a type of focus of the first lens apparatus. The first lens apparatus includes a first controller which produces a first drive signal according to the type of the first lens apparatus based on a focus control signal output from the image-taking apparatus and controls drive of the first focus lens based on the first drive signal. The second lens apparatus includes a second controller which produces a second drive signal according to the type of the second lens apparatus based on the focus control signal and controls drive of the second focus lens based on the second drive signal.

These and other characteristics of the camera system, the lens apparatus, and the interchangeable lens system of the present invention will be apparent from the following description of specific embodiments with reference to the drawings.

DETAILED DESCRIPTION OF THE PREFERRED EMBODIMENTS

An embodiment of the present invention is hereinafter described with reference to the drawings.

The embodiment is described in connection with a camera system which is comprised of an image-taking apparatus such as a television camera and a video camera and a lens apparatus (an interchangeable lens) such as a television lens and a video lens. In the camera system, one camera can be used without changing focus control signals for any types of lenses including a rear focus type and a front focus type, and a manual focus (MF)-capable lens and an auto-focus (AF)-capable lens.

Figure 1:
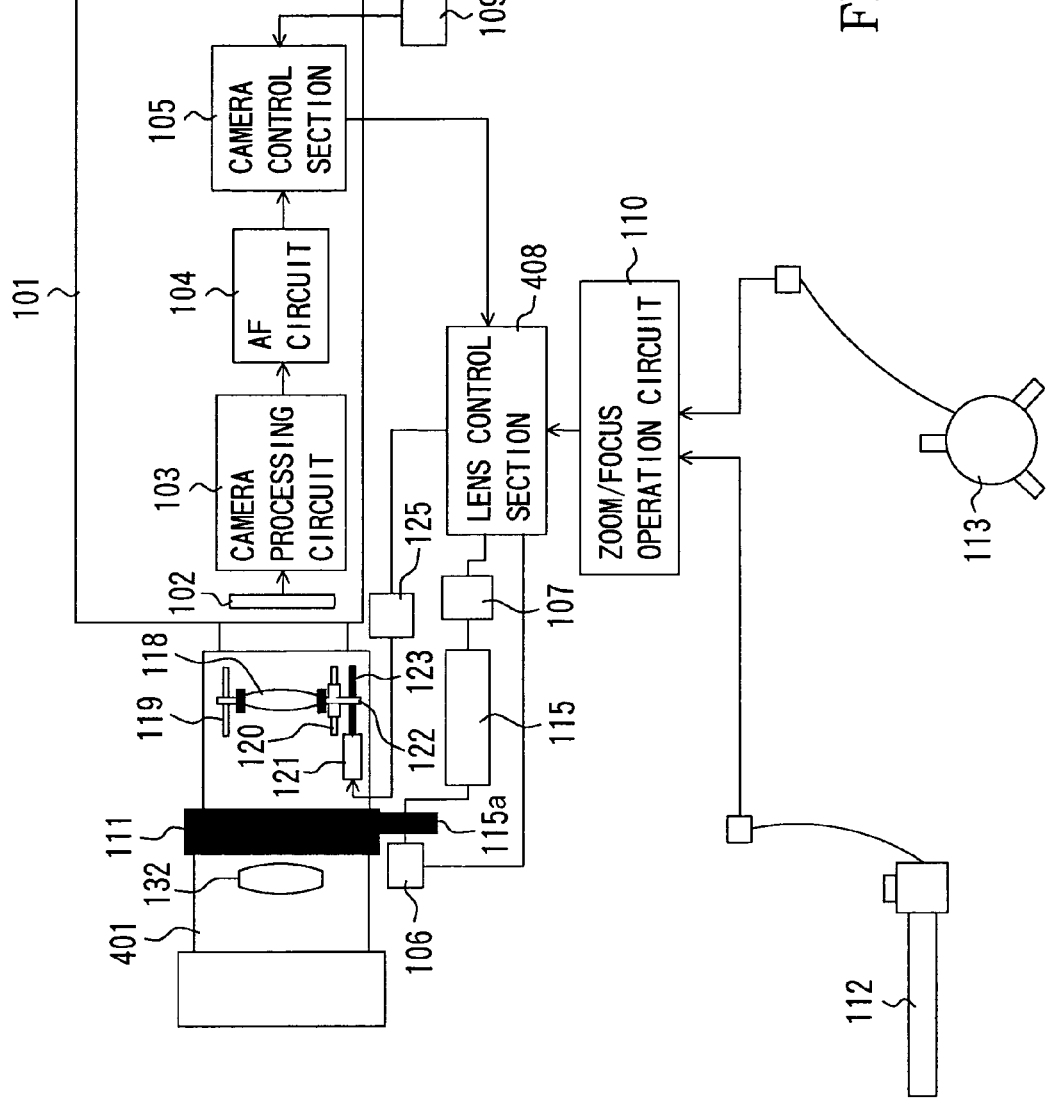
FIG. 1 is a block diagram showing the structure of a camera system which includes a rear focus lens and a camera in an embodiment of the present invention.
Figure 2:
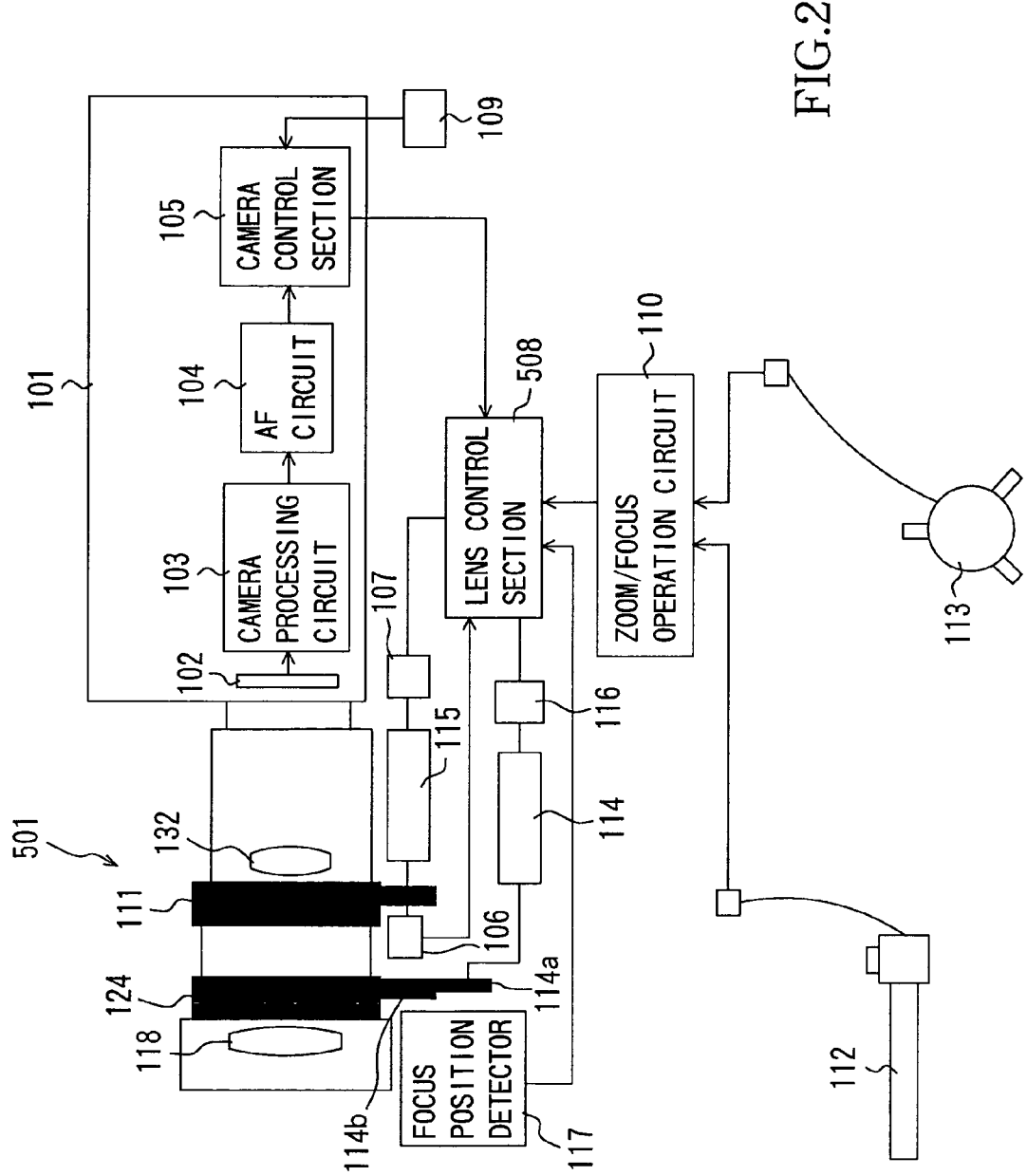
FIG. 2 is a block diagram showing the structure of a camera system which includes a front focus lens and the camera in the embodiment of the present invention.

FIG. 1 shows the structure of the camera system in which a lens apparatus of the rear focus type (hereinafter referred to as a rear focus lens) is mounted on a camera. FIG. 2 shows the structure of a camera system in which a lens of the front focus type (hereinafter referred to as a front focus lens) is mounted on the camera. In FIGS. 1 and 2, components identical to those described in the section "DESCRIPTION OF RELATED ART" are designated with the same reference numerals as those in FIGS. 4 to 8.

In FIGS. 1 and 2, reference numeral 101 shows the camera such as a video camera and a television camera (the image-taking apparatus). The camera can be used with both of an AF-capable lens and an MF-capable lens, similarly to that described in FIG. 8. However, the camera does not have the trajectory data memory 145 shown in FIG. 8. Reference numeral 401 shows a zoom lens which is realized by a rear focus lens.

On the side of the camera 101, reference numeral 102 shows an image-pickup element such as a CCD sensor and a CMOS sensor, and 103 shows a camera processing circuit which produces a video signal based on an output signal from the image-pickup element 102. The video signal is input to an AF circuit 104. The AF circuit 104 extracts a high-frequency component from the video signal and outputs it as an AF evaluation value signal to a camera control section 105 serving as a controller.

Reference numeral 105 shows the camera control section which produces and outputs a focus control signal for performing AF control based on the AF evaluation value signal from the AF circuit 104. The camera control section 105 also outputs toward the lens side a zoom control signal and a focus control signal based on operation signals for zoom and focus input from a zoom/focus controller 109 connected to the camera 101.

The lens 401 shown in FIG. 1 is the rear focus lens which has a focus lens unit 118 placed closer to an image side than a zoom lens unit 132. The lens 401 has the same optical system structure as that of the optical system of the rear focus lens shown in FIG. 4.

On the side of the lens 401, reference numeral 106 shows a zoom position detector which is coupled to a gear 115a engaging with a zoom ring 111 to detect the position of the zoom lens unit 132. When the zoom ring 111 is rotated, the zoom lens unit 132 is driven by a cam formed on a fixed barrel (see 137 in FIG. 4) in an optical axis direction to provide variable magnification.

Reference numeral 107 shows a zoom motor driver which drives a zoom motor 115 in response to a zoom drive signal from a lens control section 408.

The lens control section 408 is responsible for control of the entire lens 401. The lens control section 408 uses an AF control signal from the camera control section 105 and a zoom control signal and a focus control signal from a zoom/focus operation circuit 110 or the zoom/controller 109 to produce drive signals (a zoom drive signal and a focus drive signal) for the zoom lens unit 132 and the focus lens 118.

The lens control section 408 relies on the focus control signal to produce the focus drive signal for driving the focus lens 118 depending on the type of focus based on lens arrangements such as the front focus type and the rear focus type or based on focus control methods such as manual focus and auto-focus.

Figure 6:
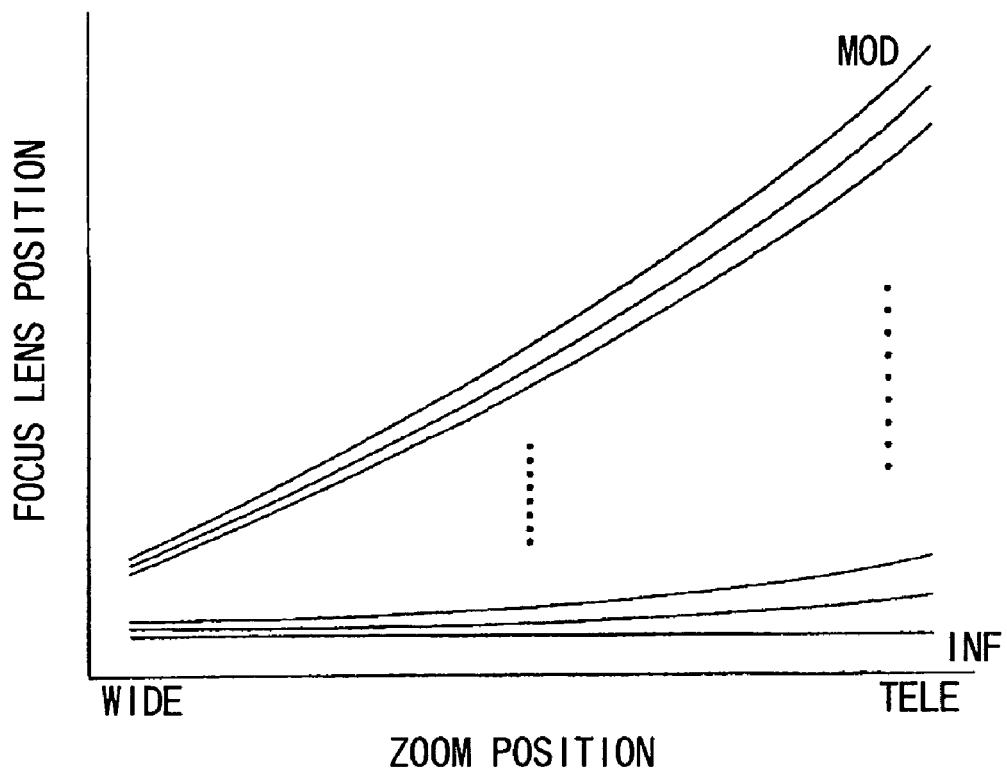
FIG. 6 is a graph showing trajectory data of a focus lens unit in connection with object distance and the position of a zoom lens unit.
Figure 7:
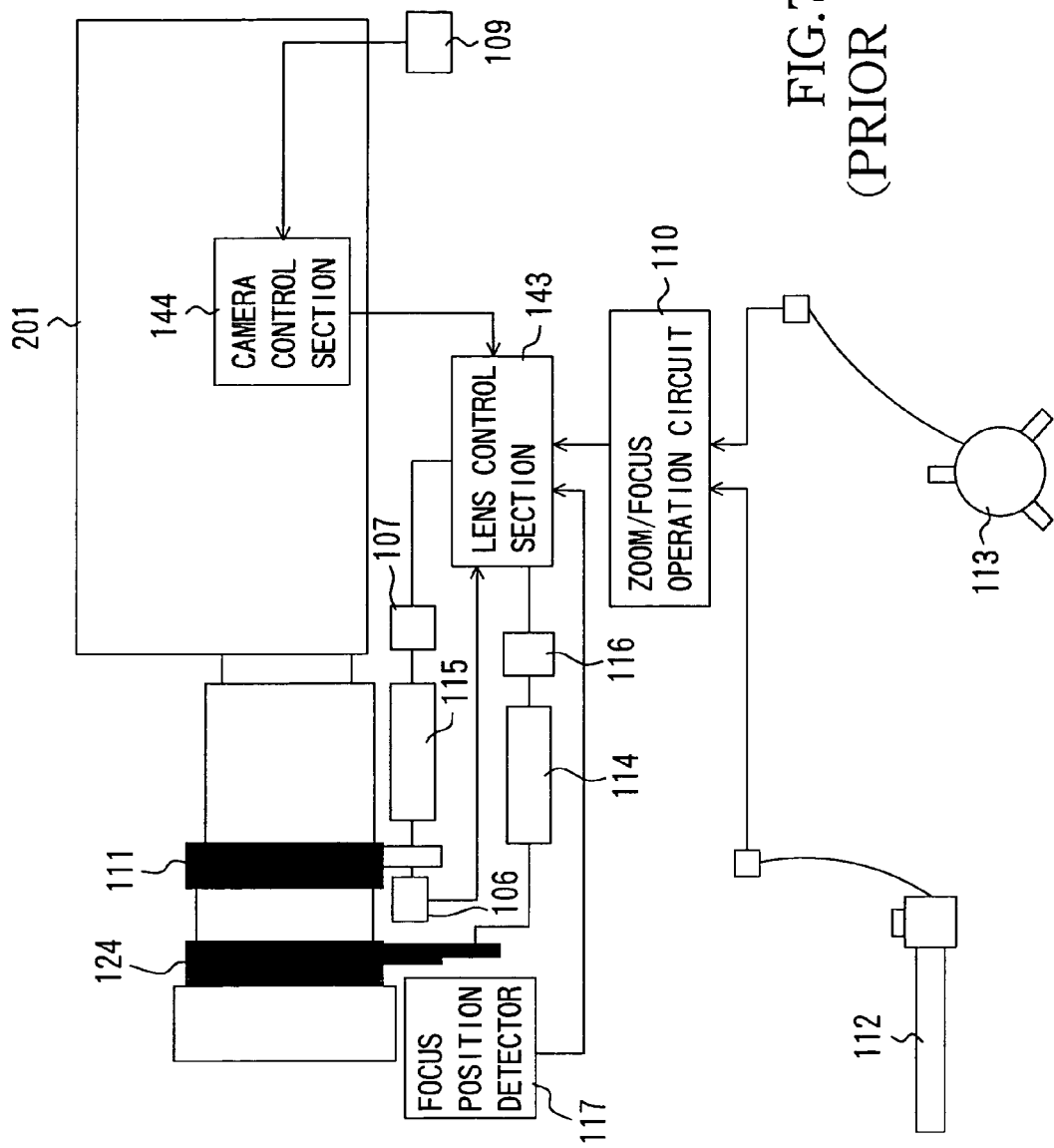
FIG. 7 is a block diagram showing the structure of a conventional camera system which includes a front focus lens and a camera.
Figure 8:
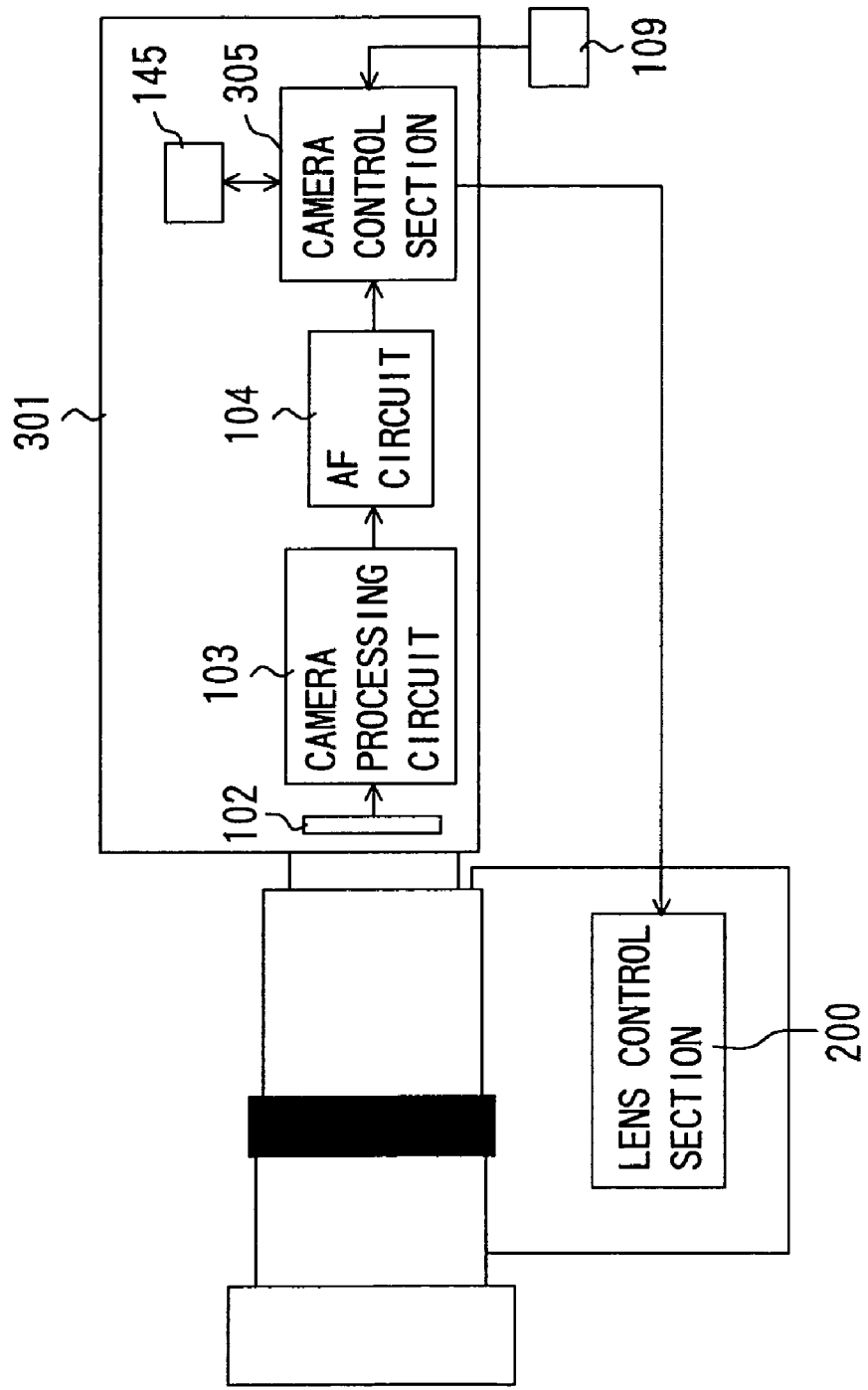
FIG. 8 is a block diagram showing the structure of a conventional camera system which allows a manual focus support lens and an auto-focus support lens to be used.

The lens control section 408 has a memory, not shown, in which zoom tracking data matching the optical characteristics of the lens 401 is stored therein, corresponding to the trajectory data shown in FIG. 6.

A zoom operation member 112 and a focus operation member 113 are connected to the zoom/focus operation circuit 110. The zoom operation member 112 produces and outputs the zoom control signal for servo-driving the zoom lens unit 132 according to an operation amount by a user. The focus operation member 113 produces and outputs the focus control signal for servo-driving the focus lens unit 118 according to an operation amount by a user.

Reference numeral 121 shows a focus motor which is realized by a step motor for driving the focus lens unit 118. By the focus motor 121 is rotated a screw shaft 123, to drive a moving frame 122 engaging therewith to the optical axis direction. The moving frame 122 holds the focus lens unit 118. Reference numerals 119 and 120 show guide bars which guide the moving frame 122 in the optical axis direction.

Reference numeral 125 shows a focus motor driver which drives the focus motor 121 in response to the focus drive signal from the lens control section 408.

Reference numeral 106 shows the zoom position detector which detects the position of the zoom lens unit on the optical axis. The number of drive pulses input to the focus motor 121 is counted by the lens control section 408. The count is used to detect the position of the focus lens unit 118.

On the other hand, a lens 501 shown in FIG. 2 shows a front focus lens in which a focus lens unit 118 is placed closer to an object side than a zoom lens unit 132. In FIG. 2, components identical to those in FIG. 1 are designated with the same reference numerals as those in FIG. 1. A camera 101 is the same as the camera shown in FIG. 1.

In the lens 501, reference numeral 114 shows a focus motor which drives the focus lens unit through interlocking gears 114a and 114b. Reference numeral 116 shows focus motor driver which drives the focus motor 114 in response to a focus drive signal from a lens control section 508.

Reference numeral 117 shows a focus position detector which detects the current position of the focus lens unit 118 and transmits it to the lens control section 508. Reference numeral 124 shows a focus ring which engages with the focus lens unit 118. The focus ring 124 is rotated by the focus motor 114 to move the focus lens unit 118 to perform manual focusing.

The lens control section 508 is responsible for control of the entire lens 501, and produces and outputs a zoom drive signal and a focus drive signal for controlling a zoom motor 115 and the focus motor 114, respectively.

When a focus operation member 113 is operated, an operation signal output from the focus operation member 113 is input to the lens control section 508 as a focus control signal through a zoom/focus operation circuit 110. Similarly, when a zoom operation member 112 is operated, an operation signal output from the zoom operation member 112 is input to the lens control section 508 as a zoom control signal through the zoom/focus operation circuit 110. The lens control section 508 produces a focus drive signal and a zoom drive signal based on the focus control signal and the zoom control signal and drives the focus motor 114 and the zoom motor 115 through the drivers 116 and 107, respectively, to rotate the focus ring 124 and a zoom ring 111. In this manner, the focus lens unit 118 and the zoom lens unit 132 are driven.

Figure 3:
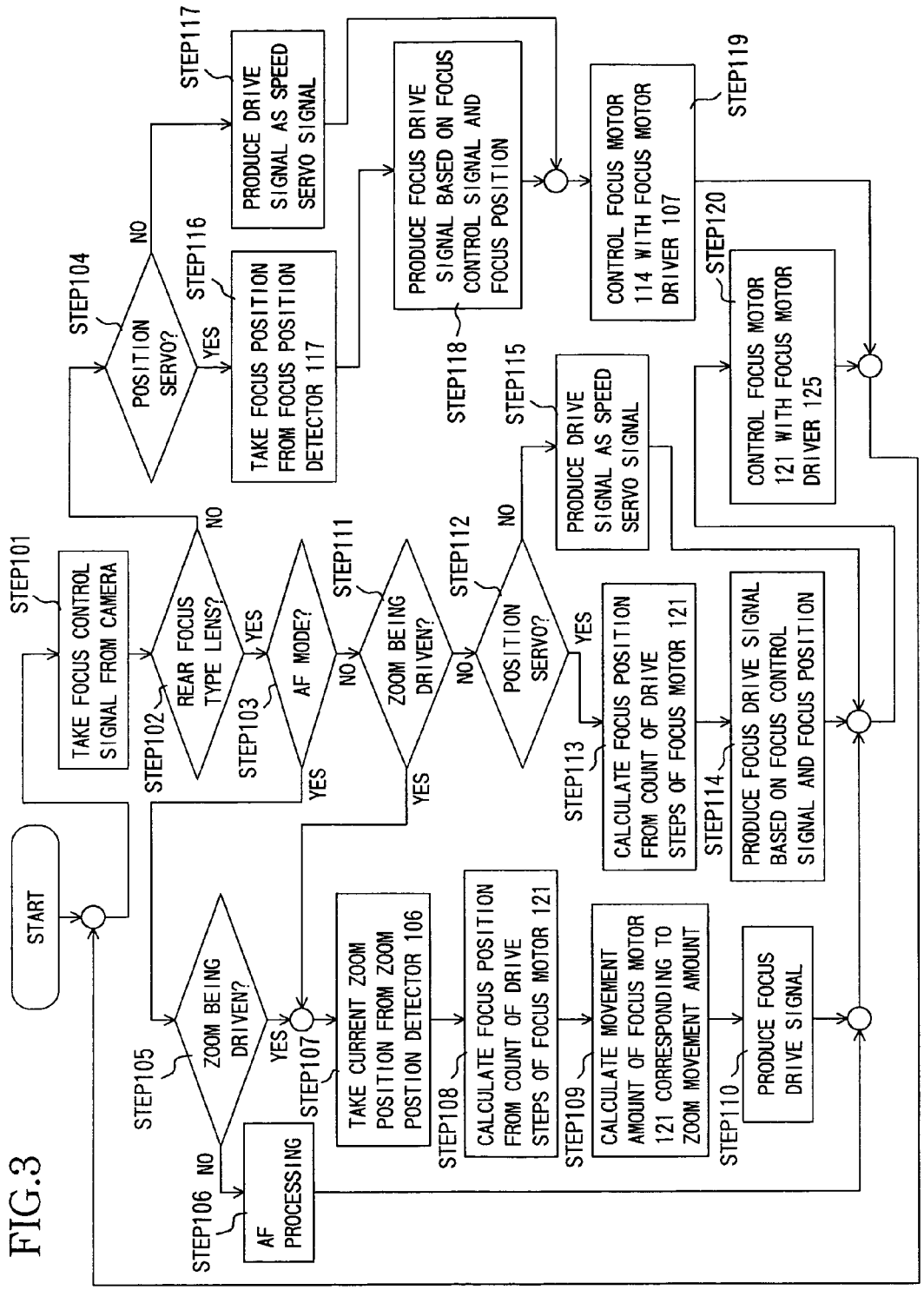
FIG. 3 is a flow chart showing a processing program performed in the rear focus lens and the front focus lens in the embodiment of the present invention.
Figure 4:
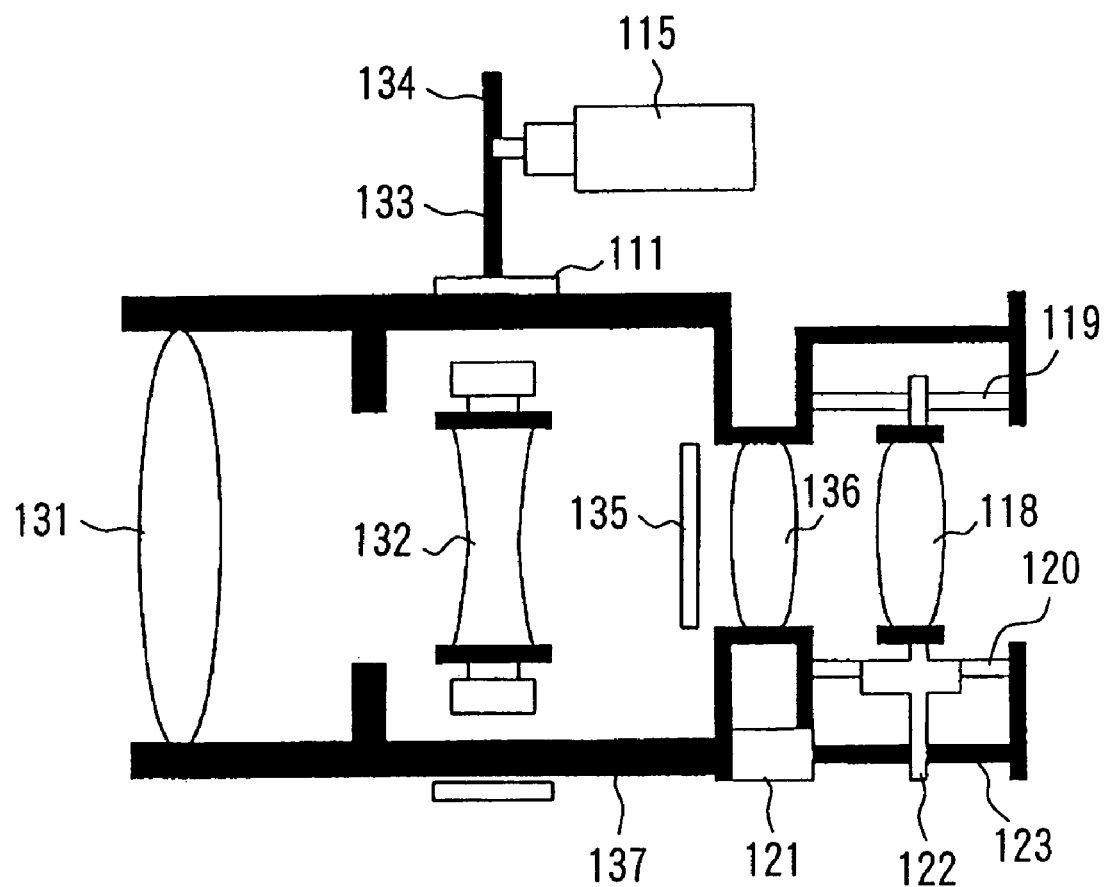
FIG. 4 is a section view showing a conventional rear focus lens.
Figure 5:
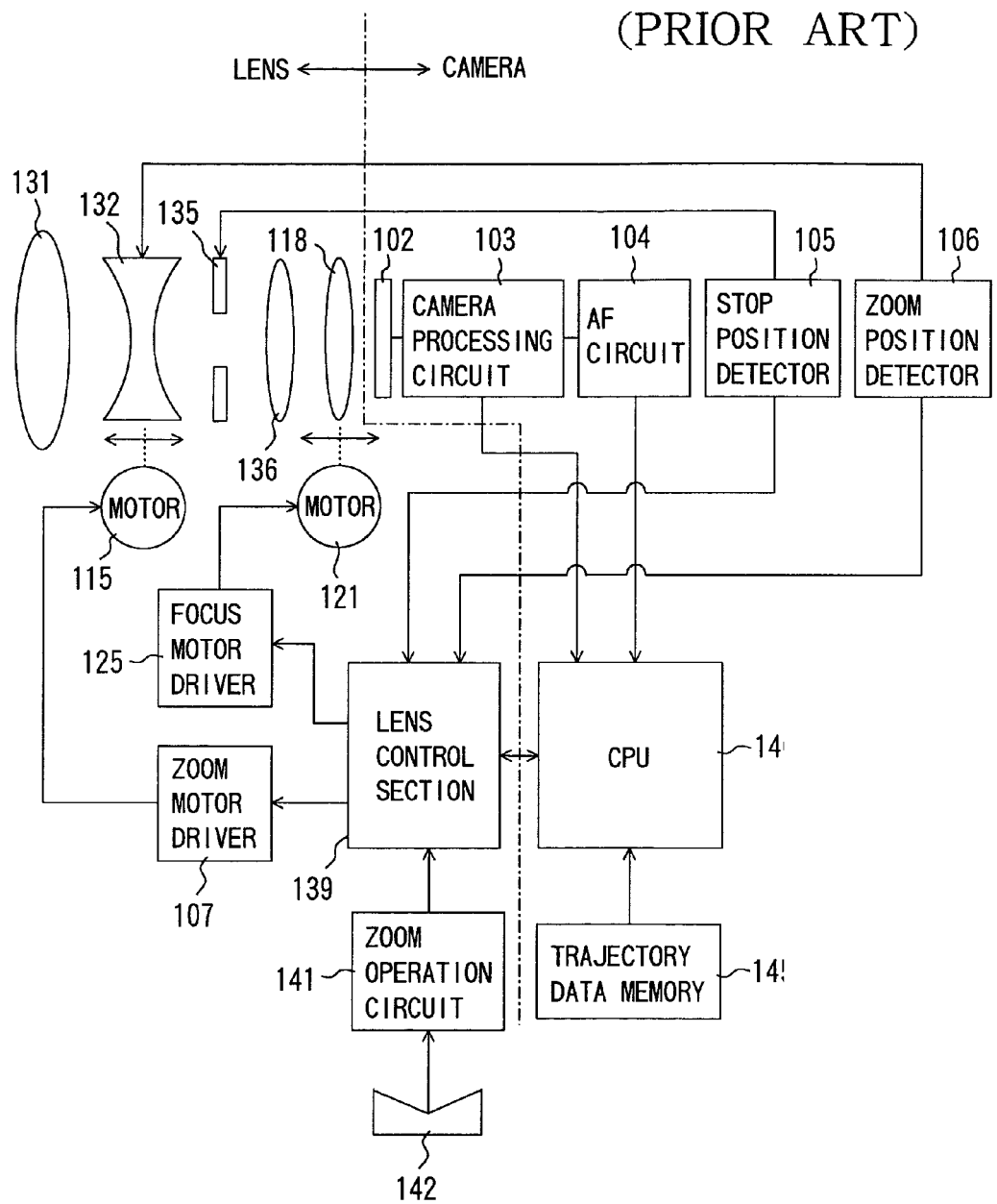
FIG. 5 is a block diagram showing the structure of a conventional camera system which includes the rear focus lens and a camera.

Next, description is made for a processing program used in common to the lens control section 401 of the rear focus lens 401 and the lens control section 508 of the front focus lens 501 in the camera system of the embodiment in which both of the rear focus lens 401 and the front focus lens 501 can be used for the one camera 101, with reference to a flow chart of FIG. 3.

In the embodiment, the focus control signal output from the camera control section 105 of the camera 101 is a position signal which represents a drive position (a drive amount) of the focus lens unit 118 or a speed signal which represents a drive direction and a drive speed of the focus lens unit 118.

The flow of the processing on the side of the AF-capable rear focus lens 401 is first described in the combination of the rear focus lens 401 and the camera 101 shown in FIG. 1.

At step 101, the lens control section 408 takes a focus control signal from the camera control section 105. Then, at step 102, it determines whether the lens itself is a rear focus lens or a front focus lens.

Since the rear focus lens is used in this case, the flow proceeds to step 103 to determine the current focus mode is an AF mode or an MF mode. In the case of the AF mode, the flow proceeds to step 105 where the lens control section 408 monitors an output from the zoom position detector 106 to determine whether or not the zoom lens unit 132 is being driven (whether or not zooming is being driven).

When it is determined that zooming is not being driven at step 105, the flow proceeds to step 106 to perform AF processing. The AF processing is later described. When the current focus mode is not the AF mode (that is, it is the MF mode) at step 103, the flow proceeds to step 111. At step 111, it is determined whether or not zooming is being driven similarly to step 105.

In the AF processing at step 106, the following control is performed in the camera 101 and the rear focus lens 401. When a luminous flux from an object passes through the rear focus lens 401 and arrives on a light-receiving surface of the image-pickup element 102, the luminous flux is photoelectrically converted by the image-pickup element 102 and the resultant electric signal is output therefrom. The camera processing circuit 103 performs various types of processing on the output signal input thereto from the image-pickup element 102 to produce a video signal.

The AF circuit 104 extracts a high-frequency component from a portion of the video signal corresponding to a focus detection area set to the center of the image screen or the like to produce an AF evaluation value signal according to the sharpness (contrast) of the object image. For example, when the focus detection area is set to the center of the image screen, the camera system is always focused on an object present at the center of the image screen.

In normal AF processing without varying magnification (without zoom drive), the camera control section 105 outputs a command signal to the lens control section 408 for causing the focus lens unit 118 to wobble in order to determine the drive direction of the focus lens unit 118 in which the strength of the AF evaluation value signal output from the AF circuit 104 is increased. The camera control section 105 then outputs a focus control signal to the lens control section 408 such that the focus motor 121 is driven in the determined direction by a predetermined number of drive steps. The processing is repeated until the AF evaluation value signal is at the maximum, that is, until an in-focus state is achieved for the object.

When it is determined that zooming is being driven at step 105 or when it is determined that the current focus mode is not the AF mode (it is the MF mode) at step 103 and that zooming is being driven at step 111, the flow proceeds to step 107.

At steps 107 to 110, the following AF processing (zoom tracking processing) is performed in order to correct image plane variations associated with zoom drive to maintain an in-focus state. In this case, the zoom tracking processing has higher priority, and focus control by the camera 101 is not performed.

First, at step 107, the lens control section 408 takes the current position of the zoom lens unit 132 by the zoom position detector 106. Next, at step 108, it calculates the position of the focus lens unit 118 from the count of drive steps for the focus motor 121. Specifically, the focus lens unit 118 is reset to a predetermined original position (a reference position) at power-up, and the drive steps from the reference position is counted to obtain the relative position of the focus lens unit 118 with respect to the reference position based on the count.

When the focus motor 121 is realized by a DC motor, the position of the focus lens unit 118 can be taken by using a focus position detector similar to the zoom position detector 106. The detected positions of the zoom lens unit 132 and the focus lens unit 118 are stored in a memory, not shown, in the lens control section 408.

Next, at step 109, to perform focus control of moving the focus lens unit 118 on zoom tracking data in association with the zoom drive, the lens control section 408 first calculates a point (an in-focus position) on the zoom tracking data which matches the current position of the zoom lens unit 132 and the current position of the focus lens unit 118. Next, the lens control section 408 calculates a drive amount of the focus lens unit 118 for moving the focus lens unit 118 corresponding to the movement amount of the zoom lens unit 132 on the zoom tracking data.

The lens control section 408 outputs a focus drive signal necessary for the drive of the calculated drive amount at step 110, and drives the focus motor 121 through the focus motor driver 125 at step 120.

When it is determined that zooming is not being driven at step 111, the flow proceeds to step 112 where it is checked whether the focus control signal from the camera control section 105 is a position signal or a speed signal. In the case of the position signal, the position of the focus lens unit 118 is calculated from the count of drive steps for the focus motor 121 (step 113). Then, the lens control section 408 produces a focus drive signal based on the focus control signal and the calculated position of the focus lens unit 118 (step 114).

Since position servo is used in this case, the focus motor 121 is stopped when it is determined that the drive position indicated by the focus control signal is equal to the position of the focus lens unit 118 calculated from the count of the drive steps for the focus motor 121.

On the other hand, when it is determined that the focus control signal is the speed signal (speed servo) at step 112, the lens control section 408 considers the focus control signal as the speed signal and produces a focus drive signal (step 115). Then, it drives the focus motor 121 through the focus motor driver 125 (step 120).

Next, description is made for the flow of processing on the side of the front focus lens 501 in the combination of the MF-capable rear focus lens 501 and the camera 101 shown in FIG. 2.

When the lens control section 501 takes a focus control signal at step 101, it determines whether the lens itself is a rear focus lens or a front focus lens. Since the front focus lens is used in this case, the flow proceeds to step 104 to check whether the focus control signal is a position signal or a speed signal. In the case of the position signal, the focus position detector 117 takes the position of the focus lens unit 118 (step 116).

The lens control section 508 produces a focus drive signal from the focus control signal and the taken position of the focus lens unit 118 (step 118). Since position servo is used in this case, the focus motor 114 is stopped when it is determined that the position indicated by the focus control signal is equal to the position of the focus lens unit 118 detected by the focus position detector 117.

When it is determined that the focus control signal is the speed signal at step 104, the lens control section 501 considers the focus control signal as the speed signal and produces a focus drive signal (step 117).

Then, it drives the focus motor 114 through the focus motor drive 116 (step 120).

In this manner, according to the embodiment, it is possible for the lens to determine the type of focus in the lens, that is, the type of the lens arrangement such as the front focus type and the rear focus type, and the type of the focus control method such as the manual focus support and the auto-focus support to produce the focus drive signal according to the determined type based on the focus control signal from the camera side. This eliminates the need to change the focus control signal output from the camera side depending on the type of the lens mounted on the camera. Consequently, a plurality of types of lenses can be used for one camera.

In addition, the focus control calculations are made by using the trajectory data (the zoom tracking data) in the AF-capable lens, so that it is not necessary to transmit the large amount of trajectory data from the lens to the camera. Moreover, it is not necessary for the camera to have a memory for storing the trajectory data or have the function of focus control calculations with the trajectory data.

While a preferred embodiment has been described, it is to be understood that modification and variation of the present invention may be made without departing from the scope of the following claims.

This application claims priority from Japanese Patent Application No. 2003-343923 filed on Oct. 2, 2003, which is hereby incorporated by reference herein.

What is claimed is:

1. A lens apparatus which is mounted on an image-taking apparatus, the lens apparatus comprising:

a focus lens unit; and a controller configured to generate a drive signal based on a focus control signal and a type of focus of the lens apparatus to control drive of the focus lens unit using the drive signal, wherein the focus control signal represents a drive target position or a drive speed of the focus lens unit, wherein, when auto-focus is performed, the controller receives from the image-taking apparatus the focus control signal calculated by a processor provided in the image-taking apparatus based on an evaluation value for the auto-focus obtained in the image-taking apparatus, and wherein, when manual focus is performed in response to an operation of a first focus operation member directly connected to the image-taking apparatus, the controller receives from the image-taking apparatus the focus control signal generated according to an operation amount of the first focus operation member, and when the manual focus is performed in response to an operation of a second focus operation member connected to the lens apparatus not through the image-taking apparatus, the controller receives from the second focus operation member the focus control signal generated according to an operation amount of the second focus operation member.

2. The lens apparatus according to claim 1, wherein the type of focus includes a front focus type in which the focus lens unit is placed closer to an object side than a variable magnification lens unit, and a rear focus type in which the focus lens unit is placed closer to an image side than the variable magnification lens unit.

3. The lens apparatus according to claim 1, wherein the type of focus includes an auto-focus support type in which zoom tracking data is used to maintain an image plane position in response to varied magnification and the drive of the focus lens unit is controlled on the basis of the zoom tracking data, and a manual focus support type in which the focus lens unit is driven on the basis of a signal according to operation by a user.

* * * * *